United States Patent [19]
Koester et al.

[11] Patent Number: 5,283,024
[45] Date of Patent: Feb. 1, 1994

[54] METHOD OF PRODUCING PERBORATE

[75] Inventors: Klaus Koester, Langenfeld; Franz-Josef Carduck, Haan; Ulrich Jahnke, Monheim, all of Fed. Rep. of Germany; Seamus French, Oatley, Australia

[73] Assignee: Degussa Aktiengesellschaft, Frankfurt am Main, Fed. Rep. of Germany

[21] Appl. No.: 659,332

[22] PCT Filed: Aug. 30, 1989

[86] PCT No.: PCT/EP89/01015

§ 371 Date: Dec. 9, 1991

§ 102(e) Date: Dec. 9, 1991

[87] PCT Pub. No.: WO90/02703

PCT Pub. Date: Mar. 22, 1990

[30] Foreign Application Priority Data

Sep. 8, 1988 [DE] Fed. Rep. of Germany ....... 3830545

[51] Int. Cl.$^5$ ............................................. C01B 15/12
[52] U.S. Cl. ..................... 264/118; 252/99; 264/141; 423/277
[58] Field of Search ............... 264/118, 141, 142, 143; 423/277; 252/186.3, 186.31, 99

[56] References Cited

U.S. PATENT DOCUMENTS

| | | | |
|---|---|---|---|
| 2,900,668 | 8/1959 | Hubner et al. | 264/142 |
| 3,227,790 | 1/1966 | Bretschneider et al. | 264/117 |
| 4,405,486 | 9/1983 | Eoga | 252/186.31 |
| 4,904,458 | 2/1990 | Dugua et al. | 423/277 |

FOREIGN PATENT DOCUMENTS

| | | |
|---|---|---|
| 0155894 | 9/1985 | European Pat. Off. . |
| 0194952 | 8/1988 | European Pat. Off. . |
| 1037432 | 8/1958 | Fed. Rep. of Germany . |
| 1052372 | 8/1959 | Fed. Rep. of Germany . |
| 1240508 | 5/1967 | Fed. Rep. of Germany . |
| 1930286 | 2/1970 | Fed. Rep. of Germany . |
| 2040507 | 2/1972 | Fed. Rep. of Germany . |
| 2258319 | 6/1974 | Fed. Rep. of Germany . |
| 2447780 | 4/1975 | Fed. Rep. of Germany . |

Primary Examiner—Mary Lynn Theisen
Attorney, Agent, or Firm—Beveridge, DeGrandi, Weilacher & Young

[57] ABSTRACT

A method for the production of granular sodium perborate tetrahydrate is disclosed herein. The method includes the steps of adding 0.3–5% by weight of a sodium salt or a potassium salt of a polymeric carboxylic acid to powdered perborate tetrahydrate, softening the mixture by heating under pressure to form a plastically deformable mass, deforming the plastically deformable mass into thin strands by pressing, and comminuting the strands into granular form. The perborate tetrahydrate may be de-watered to produce granular perborate monohydrate. The final granular products exhibit high abrasion resistance and are preferably used in washing and cleaning agents.

17 Claims, No Drawings

METHOD OF PRODUCING PERBORATE

The present invention is relative to the production of sodium perborate tetrahydrate and its further processing to monohydrate.

Sodium perborate has found many applications on account of its ability to be reliably handled and on account of its chemical stability as oxidation agent, e.g. as a mild disinfection agent, but especially as a bleaching agent, especially in the washing of textiles Sodium perborate, commonly designated only as perborate, has long been a component of most of the powdery household detergents in Europe The most significant ones in a technical sense in this connection are primarily the so-called sodium perborate tetrahydrate and the so-called sodium perborate monohydrate, which are actually, according to current knowledge, the hexahydrate and the anhydrous form of ring-shaped disodium diperoxodiborate. However, the customary designations of perborate tetrahydrate (empirical formula $NaBO_3 \cdot 4 H_2O$) and perborate monohydrate ($NaBO_3 \cdot H_2O$) will continue to be used in the following. The characterization about the available oxygen content which is customary in practice will also be valid in the following connection In accordance therewith, all perborates are designated as sodium perborate monohydrate which contain more than 15% by weight available oxygen (theoretical value for $NaBO_3 \cdot H_2O$: 16.0% by weight AO).

When producing perborates, one generally begins with sodium borate solutions and obtains the tetrahydrate therefrom, after the addition of hydrogen peroxide, by means of cooling in crystalline form. The monohydrate is produced therefrom by means of dewatering, preferably with warm air in a fluid bed.

A great number of methodological variations have been suggested with the goal of improving the yield and the quality of perborates; however, only a few of them have proven themselves in practice. A problem which has not yet been solved to general satisfaction is the abrasion stability of perborate monohydrate. Very porous and readily decomposing grains form on account of the rapid exiting of water in the customary drying methods, with the result that a large part of the drying product accumulates as dust. However, abrasion-resistant material is of particular interest for use in detergents, which material should also correspond in its grain size approximately to that of a detergent, that is, approximately 0.3 to 2 mm.

None of the methods previously suggested for the production of an especially abrasion-stable monohydrate is free of disadvantages. Thus, the work is performed with especially high air temperatures of 180° to 210° C. in a fluid bed in the method of DE 19 30 286. However, such high temperatures are also problematic for thermally relatively resistant per compounds like the perborates, and, in addition, the use of such high temperatures is expensive from a technical heating standpoint In the method according to DE 20 40 507, the monohydrate is moistened on the surface after the customary production once again, preferably in a revolving tube, and redried. The method thus requires two additional method stages. The methods according to DE 22 58 319 and DE 24 47 780 dry the tetrahydrate at high relative air moistures. However, this causes the drying to last correspondingly longer and requires larger apparatuses and more energy. Finally, in the method according to EP 194,952, the temperature of the fluid bed is regulated in such a manner during the drying that it is above the melting temperature of the tetrahydrate. There is also the danger here of a chemical decomposition of the perborate. All the above-named methods for improving the abrasion stability of perborate monohydrate scale [become encrusted] in the drying stage of tetrahydrate. In most instances, a fine-grained component which was already present in the tetrahydrate therefore also remains in the monohydrate and must be removed from it if necessary.

On the other hand, it was also determined that an abrasion-stable monohydrate can be obtained in a simpler manner by using a specially pretreated tetrahydrate for drying. If the drying starts with a perborate tetrahydrate which was granulated according to DE 10 52 372 under partial softening, e.g. with the aid of an extruder, then an abrasion-stable monohydrate which is largely free of fine components is obtained without special expenditures during the drying. The problems in this method of production are to be found at the stage of tetrahydrate granulation: The temperature range in which powdery perborate tetrahydrate exhibits the plasticity suitable for extrusion according to DE 10 52 372 is extremely small, approximately 2° C. Below this range, no sufficient agglomeration takes place, even under the pressure of an extruder, and above the range the tetrahydrate melts to the extent that the strands adhere after leaving the extruder and can not be processed further. The maintaining of the narrow temperature range of 2° C. caused such great problems in practice on account of the well-known difficulty of managing the temperature in an extruder that the method according to DE 10 52 372 was never used on an industrial scale.

It has now been surprisingly found that the temperature range in which perborate tetrahydrate exhibits a plasticity suitable for extrusion can be considerably expanded if certain polymeric, organic compounds are added to the tetrahydrate.

The first subject matter of the invention is therefore constituted by a method for the production of a granular sodium perborate tetrahydrate in which powdery perborate tetrahydrate is softened by being heated under pressure, the plastically deformable but not deliquescing mass is formed by pressing into thin strands and these strands are comminuted, characterized in that 0.3–5% by weight of a sodium salt or potassium salt of a polymeric carboxylic acid is mixed into the perborate tetrahydrate before processing, which carboxylic acid exhibits an acid value between approximately 100 and approximately 1000, preferably between approximately 150 and approximately 900, as well as an average molecular weight between approximately 4000 and approximately 300,000, preferably between approximately 4000 and approximately 150,000.

The addition of the polymeric alkali salts in accordance with the invention expands the temperature range in which the tetrahydrate exhibits sufficient plasticity and can be processed without problems to 5° to 8° C., thus achieving a range which renders a large-scale operation possible which is largely free of disturbances. It is readily possible to maintain the specified temperature ranges even in large extrusion systems with very sluggish temperature-regulating behavior. At the same time, the addition of polymer does not negatively affect the drying behavior of the tetrahydrate granulated in this manner, so that the drying can be carried out in a rapid and energy-saving manner in a single stage in traditional systems, yielding an extraordinarily abrasion-stable, dust-free monohydrate.

The polymeric salts added in accordance with the invention are preferably those salts in which on the average more than 50 mole percent of the acid groups present in the polymeric carboxylic acid are present in the salt form. Those compounds are especially preferred in which more than 80 mole percent, especially more than 90 mole percent of the acid groups are present in the salt form. Furthermore, of the alkali salts cited, the sodium salts are preferred.

The suitable salts of the invention and the polymeric carboxylic acids they are based on can be produced in known manners. Thus, polymers which are free of carboxyl groups can be converted by means of polymer-analogous reactions into polymeric carboxylic acids (and their salts). Examples for this reaction, which is optionally only partially carried out, are the hydrolysis of polyacrylamide and the carboxymethylation of cellulose. Another possibility is to homopolymerize polymerizable carboxylic acid or its salts or to copolymerize it or them with suitable comonomers and, as an option, to neutralize it or them with alkalis Examples for this production method are the homopolymerization of acrylic acid and the copolymerization of acrylic acid with ethylene.

Within the scope of the invention, the sodium salts of carboxymethylcelluloses with degrees of substitution (number of carboxymethyl groups per unit of anhydroglucose, DS) of approximately 0.5 to approximately 1, preferably 0.6 to 0.9 and especially the sodium salts of copolymerizates from acrylic acid and/or methacrylic acid with maleic acid in a molar ratio of approximately 10:1 to approximately 1:10, preferably approximately 2:1 to approximately 1:5 are preferred. The molecular weights are in the case of carboxymethylcelluloses preferably between approximately 50,000 and approximately 150,000, especially between approximately 70,000 and approximately 100,000; in the case of maleic-acid copolymerizates preferably between approximately 50,000 and 200,000 and especially between approximately 50,000 and 150,000. (Determined with the aid of gel permeation chromatography and expressed as weight average.) The salts of carboxymethylcellulose are frequently characterized solely by the viscosity of the aqueous solutions. According to the invention, CMC-Na salts are suitable in accordance with the above which exhibit viscosities in industrial quality (content approximately (50-80%) of preferably 200-8000 mPas, especially 1500-4000 mPas (as 5% aqueous solution) and viscosities in purified form (as 2% aqueous solution) of preferably 200-500 mPas, especially 1500-4000 mPas (measurement according to Brookfield at 20° C. and 20 rpms) The above-named polymer salts, which are especially suitable for the method of the invention, are distinguished in that they expand the plasticity range of the perborate tetrahydrate up to 8° C. The fact is also to be considered advantageous that the remaining of these salts in the perborate tetrahydrate additionally improves the properties of the monohydrate produced therefrom by drying, especially its abrasion stability. In addition, the polymeric additives do not disturb the use of perborates in detergents in any way.

The method of the invention differs from the method of DE 10 52 372 in an essential manner by virtue of the addition of the specified polymeric salts. This addition can basically take place at any time prior to the processing of the tetrahydrate in the extruder, e.g. by means of addition before or during the crystallization within the framework of the production of tetrahydrate. However, the mixing in of the polymeric salts preferably takes place immediately prior to the processing in the extrusion device, for which a special mixing apparatus can be provided. However, a common or simultaneous dosing of perborate tetrahydrate and of polymeric salt into the extruder is especially preferred, during which the turbulence in the intake area of the device is utilized for a uniform mixing. The polymeric salt can be added in dry form or, preferably, in the form of a concentrated aqueous preparation to the perborate tetrahydrate. When used in the form of a concentrated aqueous preparation containing the polymeric salt in an amount of at least 20 % by weight, preferably at least 40% by weight, perborate and polymeric salt seem to mix more rapidly. The presence of the water does not disturb the further processing of the tetrahydrate, which is preferably converted into the monohydrate. The amount of polymeric salt which is added to the tetrahydrate determines to a certain extent the width of the temperature range within which a plasticity suitable for the extrusion process is present. It is usually between 0.3 and 5% by weight. Amounts of 0.5 to 3 % by weight, calculated as polymeric salt (in the case of industrial purity only the active substance) and in relation to the perborate tetrahydrate used as initial material, have proved to be especially well-suited. Optimum results are obtained, also as regards the cost-effectiveness ratio, with additives of 0.8 to 1.5% by weight polymeric salt.

Crystalline perborate tetrahydrate is primarily used as initial material for the granulation method of the invention, the grain size of which is smaller than the smallest dimension of the holes in the sieve plate used. The initial material preferably exhibits a maximum of grain-size distribution below one half the smallest hole dimension. Dusty perborate tetrahydrate is especially preferred, that is, material with an average grain size distinctly below 0.2 mm, like that which accumulates in the production of crystalline tetrahydrate as a usually undesired fraction. The initial material can be used dry or can contain up to 5% by weight water above and beyond the hydrate water content. Thus, centrifuge-moist material is also suitable. A water content of approximately 1 to 2% by weight relative to pure tetrahydrate is especially advantageous. Higher water contents require somewhat lower extrusion temperatures. On the other hand, it is also possible to start with perborates which contain less hydrate water than the tetrahydrate if correspondingly more water is added before the granulation.

Practically all devices which permit plastifiable materials to be formed under pressure into strands are suitable for carrying out the method of the invention. This includes e.g. roll presses, pelletizing devices and perforating presses. In particular, extruders with nozzle plates and kneader with a perforated-basket granulating device are preferred. Round passage openings exhibiting diameters between 0.5 and 2 mm, especially 0.8 to 1.2 mm are preferred The comminution of the strands is carried out in these instances by means of rotating or circulating knives. Refer otherwise to the detailed presentations in DE 1 052 372, to which specific reference is made here.

After leaving the granulation device, the perborate tetrahydrate is cooled off, during which time a cooling with cold air as in DE 1 052 372 is preferred. A dustpoor sodium perborate tetrahydrate results with very narrow, precisely adjustable grain distribution, high bulk weight and high mechanical stability. In spite of its compact form, the product dissolves in water with a rapidity comparable to that of commercially available tetrahydrate.

The sodium perborate tetrahydrate obtainable in accordance with the method of the invention therefore constitutes specific subject matter of the invention. This material is readily suitable for direct use in detergents. However, it is preferably converted into sodium perborate monohydrate and not used until in this form.

The additional method step consists in the drying of the tetrahydrate of the invention with removal of up to 3 moles hydrate water as well as of any adhering moisture. It constitutes further subject matter of the invention. In principle, almost all known drying methods are suitable for the drying step in as far as they do not result in a decomposition of the perborate or in an overdrying with formation of undesired oxoborates. This is the case in particular if the individual grains can reach temperatures which are too high. The drying is therefore carried out with preference in a current of gas or air; a drying with the aid of fluid-bed dryers or vibration dryer is especially preferred. Air entry temperatures of e.g. 100° to 180° C. can be used when operating these devices if care is taken at the same time that the product temperature does not exceed approximately 70° C, even toward the end of the drying process. The work is preferably performed in such a manner that the drying takes place at an air entry temperature of 120° to 140° C. and air velocities of 0.9 to 1.1 m/s and that the product temperature is between 60° and 65° C. toward the end. If the drying of the tetrahydrate directly follows the granulation of the tetrahydrate, then the cooling of the tetrahydrate after the granulation step can be largely or completely eliminated. After the end of the dewatering process, the monohydrate is cooled off in a current of air to the extent that a problem-free storage is possible The drying method of the invention can be carried out in a single stage and requires no additional measures. It achieves the goal very rapidly and therefore permits the use of small systems as regards product throughput. Little dust forms, in spite of the high product throughput. The dust is generally removed with the exhaust air and filtered out. It can be mixed in with the final product in most instances on account of its small amount and in other instances it is brought into the granulation process of the tetrahydrate.

The granular final product exhibits an extremely high abrasion resistance and has a high bulk weight but dissolves in water just as rapidly as commercial perborate monohydrate. The sodium perborate monohydrate obtainable with the method of the invention therefore constitutes further subject matter of the present invention.

All areas of application which are known for traditional monohydrate can be considered for the new industrial form of perborate monohydrate It is suitable e.g. for use as bleaching agent and disinfecting agent, as oxidation agent or as carrier of available oxygen for other purposes and it can be processed further to oxoborate. However, the preferred area of use is its application in all types of washing and cleaning agents, in which its high abrasion resistance and the narrow grain spectrum are especially effective and advantageous.

EXAMPLES

Example 1

Perborate tetrahydrate as it accumulates in dust form during the drying of crystalline perborate tetrahydrate (grain distribution: 90% below 0.2 mm) and which contained 1.5% moisture in addition to the hydrate water was uniformly sprayed with 2.5% by weight of a 40% solution of the sodium salt of a copolymerizate of acrylic acid and maleic acid (weight ratio 78:22, Sokalan ® CP of the BASF company, Germany). The mixture was then extruded at 20 kg/h in a co-kneader of the type PR 46 (Buss company, Pratteln, Switzerland) with perforated-basket granulator (hole diameter 0.8 mm). The kneader was heated with warm water. At product temperatures between 54° and 62° C., the tetrahydrate exhibited a plasticity sufficient for stranding [forming strands] and was able to be extruded in the form of thin strands and fabricated in the form of small, short rods by means of a revolving knife driven via the extruder shaft (knife speed 120 rpms, knife interval to perforated basket 2.5 mm).

The resulting chopped-off granulate, which hardened immediately upon cooling off, had a narrow grain distribution and was practically dust-free: Sieve analysis (% by weight):

at 1.6 mm: 0.4%
at 0.8 mm: 85%
at 0.4 mm: 8.3%
at 0.2 mm: 3.5%
at 0.1 mm: 1.7%
at 0.05 mm: 1%
lower: 0.1%.

The bulk density was 670 g/l; the available oxygen content corresponded with 10.2% by weight to tha of the initial material.

In order to determine the abrasion resistance, 100 g of the product were ground for 5 minutes in a ball mill of porcelain (inner diameter 130 mm, height 100 mm, 8 steel balls of 20 mm diameter) at a speed of 150 rpms. Then, the fine grain portion under 0 2 mm was re-determined by sieve analysis It had increased by only 3.1%.

Example 2

Perborate fine dust containing 4 % moisture was now processed as in example 1. The temperature range suitable for plastification was 52° to 60° C. here. The co-kneader was operated at a worm speed of 150 rpms, so that the chopped-off granulate become somewhat finer. Sieve analysis:

at 1.6 mm: 1.0%
at 0.8 mm: 65.0%
at 0.4 mm: 22.8%
at 0.2 mm: 5.8%
at 0.1 mm: 3.6%
at 0.5 mm: 1.7% [sic - 0.05?]
lower: 0.2%

The bulk density was 700 g/l. In the test for abrasion resistance (ball mill), the portion under 0.2 mm increased only by 0.8%.

Example 3

The same initial materials as in example 2 were formed to strands here with the aid of a double-worm extruder (type Labor-Presse [laboratory press] D 91 000 000, counter-rotating worm conveyors, 6 D, Lihotzky company, Plattling, Germany) through a nozzle plate (hole diameter 0.8 mm) and cut by a revolving knife to lengths of 0.8–1.2 mm. The extruder was heated with warm water in such a manner that the product exiting temperature was between 53° and 59° C. The granulate was practically dust-free (grain portion under 0.2 mm less than 1%) and very abrasion resistant. In the test, the dust portion below 0.2 mm did not increase by more than 5%.

Example 4

Centrifuge-moist (4% H₂O) perborate tetrahydrate crystallizate was processed here in the same manner as in example 1 with the following sieve analysis:
- at 1.6 mm: 0%
- at 0.8 mm: 1.6%
- at 0.4 mm: 66.8%
- at 0.2 mm: 24.0%
- at 0.1 mm: 3.0%
- at 0.05 mm: 2.7%
- lower 1.8%

The extrusion took place after the addition of 0.5% by weight Sokalan CP 5 in the form of a 40% aqueous solution; the plasticity range was 50°–58° C. The product exhibited a bulk weight of 660 g/l and displayed the following sieve analysis:
- at 1.6 mm: 0%
- at 0.8 mm: 89%
- at 0.4 mm: 8.6%
- at 0.2 mm: 1.5%
- at 0.1 mm: 0.7%
- at 0.05 mm: 0.1%
- lower: 0.1%

In the abrasion test, the portion below 0.2 mm rose by 3.3%. In contrast thereto, in the case of the crystallizate used as initial material, the portion below 0.2 mm increased by 9.5% in the same test.

Example 5 (reference)

The method according to claim 1 was carried out in the same manner but without the addition of the polymer salt. The temperature range suitable for the stranding was between 57° and 59° C. and was able to be maintained in a precise manner only for more or less short periods of time. The product, which was extruded at the provided temperature, exhibited, in contrast to the product of example 1, a distinctly higher portion with grain sizes above 1.6 mm. This is an indication that even if the temperature interval is maintained, local or temporary overheatings which resulted in a caking of the strands were not able to be entirely avoided:
Sieve analysis:
- at 1.6 mm: 9.2%
- at 0.8 mm: 82.7%
- at 0.4 mm: 7.5%
- at 0.2 mm: 0.3%
- at 0.1 mm: 0.1%
- at 0.05 mm: 0.1%
- lower: 0.1%
- Bulk weight 660 g/l

Example 6

Perborate tetrahydrate fine dust (with 1.5% moisture) was mixed in a Lodige mixer with 4% by weight of a solution containing 25% by weight of the sodium salt of a maleic acid—olefin copolymerizate (Sokalan ® CP 9, molecular weight 1200, BASF company, Germany). The mixture was extruded in a Buss kneader (as in example 1) at 52° C. with a throughput of 15 kg/h. The plasticity range here was 51°–58° C. The finished product exhibited a bulk density of 610 g/l and had the following grain-size distribution:
- at 1.6 mm: 2.0%
- at 0.8 mm: 58%
- at 0.4 mm: 34.4%
- at 0.2 mm: 4.9%
- lower: 1.7%

In the abrasion test, the portion below 0.2 mm increased only by 5.5%.

Example 7

2 kg of the tetrahydrate granulate produced in example 1 were dried with warm air in a laboratory fluid-bed dryer of the type STREA-1 (Aeromatik company, Bubendorf, Switzerland). The drying conditions were: Air entry temperature 120° C., air flow 55 m³/h, air exiting temperature at the end of drying 62°, drying time 45 minutes. A perborate monohydrate resulted with an available oxygen content of 15.7% by weight, a bulk weight of 542 g/l and the following sieve analysis:
- at 1.6 mm: 1.1%
- at 0.8 mm: 66.8%
- at 0.4 mm: 28.2%
- at 0.2 mm: 3.5%
- at 0.1 mm: 0.2%
- at 0.05 mm: 0.1%
- lower: 0.1%

In the abrasion test (as in example 1), the fraction below 0.2 mm increased only by 5.4%.

Example 8

Tetrahydrate granulate from example 1 was dried in a continuously operated fluid-bed dryer with 0.4 m² drying area (Allgaier company, Uhingen, Germany) in an amount of 80 kg/h. 49.5 kg/h monohydrate (15.3% AO) and 4.1 kg/h dust (12.6% AO) from the exhaust air as filtered residue were obtained The drying conditions were: Air entry temperature 120° C., air amount 1420 m³/h, product temperature 68° C. The exiting monohydrate was cooled off in a following cooling zone with air to 25° C. and then stored.

The product had a bulk weight of 535 g/l and exhibited the following sieve analysis:
- at 1.6 mm: 4.3%
- at 0.8 mm: 71.8%
- at 0.4 mm: 23.1%
- at 0.2 mm: 0.5%
- at 0.1 mm: 0.1%
- at 0.05 mm: 0.2%
- lower: 0

In the abrasion test, the fraction below 0.2 mm increased only by 10.8%. In the present test, the dryer output was 125 kg/h·m² and thus approximately three times higher than when moist air was used for drying in the same dryer according to DE 22 58 319. The product obtained was nevertheless extremely abrasion-resistant.

Example 9 (reference)

Non-granulated perborate tetrahydrate crystallizate (used as in example 4) was dried under the conditions described in example 7 in the Aeromatic fluid bed. A monohydrate resulted with a bulk weight of 492 g/l and the following sieve analysis:
- at 1.6 mm: 0%
- at 0.8 mm: 0.9%
- at 0.4 mm: 75.6%
- at 0.2 mm: 21.7% at 0.1 mm: 1.4%
at 0.05 mm: 0.3%
lower: 0.1%

The material was not abrasion-resistant; in the test, the fraction below 0.2 mm increased by 35.3%.

Example 10

650 kg/h perborate tetrahydrate fine dust, 10 kg/h powdery Na-carboxymethylcellulose (DS 0.8-0.95, approximately 65%; Relatin ® U 300, Henkel company, Germany) and 15 kg/h water were charged into a continuously operated co-kneader (Buss company, Pratteln, Switzerland) and mixed at a heating temperature of 65° C. The plastified material was extruded via a perforated basket (hole diameter 1 mm) and cut. The exiting temperature of the product was between 55° and 60° C. A practically dust-free product was obtained whose grain size was 98% between 0.4 and 1.6 mm. In the abrasion test, the grain portion below 0.2 mm increased only by 5%.

A part of the accumulating product was dried to monohydrate with 15.4% AO in an Aeromatic fluid-bed dryer (laboratory device) at an infeed[supply]-air temperature of 120° C. The product exhibit the following grain distribution in sieve analysis:
at 0.4 mm: 91%
at 0.2 mm: 6%
lower: 3%.

In the abrasion test, the fraction below 0.2 mm increased only by 8%.

We claim:

1. A method for the production of a granular sodium perborate tetrahydrate comprising: softening powdery perborate tetrahydrate by heating under pressure to form a plastically deformable mass, deforming the plastically deformable mass into thin strands by pressing, and comminuting said strands, wherein 0.3 to 5% by weight of a sodium salt or a potassium salt of a polymeric carboxylic acid are mixed into the powdery tetrahydrate before deforming, and wherein the carboxylic acid exhibits an acid value between 100 and 1000, as well as an average molecular weight between 4000 and 300,000.

2. The method according to claim 1, wherein the salt is sodium carboxymethylcellulose with a degree of substitution between 0.5 and 1, or a sodium salt of a copolymerizate of at least one member selected from the group consisting of acrylic acid and methacrylic acid with maleic acid in a molar ratio of 10:1 to 1:10.

3. The method according to claim 1, in which 0.5 to 3% by weight of the polymeric salt are added.

4. The method according to claim 1, in which the polymeric salts are added in the form of an aqueous preparation containing at least 20% by weight polymeric salt.

5. The method according to claim 1, wherein the deforming step is carried out in an extruder with a sieve plate or in a kneader with a perforated-basket granulating device.

6. The method according to claim 1, wherein the polymeric salt is mixed in immediately before the deforming step, wherein the deforming step is carried out in an extrusion device.

7. A method of producing perborate monohydrate by means of dewatering perborate tetrahydrate, comprising:

softening powdery perborate tetrahydrate by heating under pressure to form a plastically deformable mass, deforming the plastically deformable mass into thin strands by pressing, and comminuting said strands, wherein 0.3 to 5% by weight of a sodium salt or a potassium salt of a polymeric carboxylic acid is mixed into the powdery tetrahydrate before deforming, and wherein the carboxylic acid exhibits an acid value between 100 and 1000 and an average molecular weight between 4000 and 300,000, to thereby produce sodium perborate tetrahydrate; and dewatering the perborate tetrahydrate to thereby produce perborate monohydrate.

8. The method according to claim 7, in which the dewatering is carried out in a fluid-bed dryer or a vibration dryer with the aid of warm air.

9. The method according to claim 1, in which 0.8 to 1.5% by weight of the salt are added.

10. The method according to claim 1, in which the salt is added in the form of an aqueous preparation containing at least 40% by weight polymeric salt.

11. The method according to claim 7, wherein the salt is sodium carboxymethylcellulose with a degree of substitution between 0.5 and 1, or a sodium salt of copolymerizate of at least one member selected from the group consisting of acrylic acid and methacrylic acid with maleic acid in a molar ratio of 10:1 to 1:10.

12. The method according to claim 7, wherein 0.5 to 3% by weight of the polymeric salt is added.

13. The method according to claim 7, wherein the polymeric salts are added in the form of an aqueous preparation containing at least 20% by weight polymeric salt.

14. The method according to claim 7, wherein the deforming step is carried out in an extruded with a sieve plate or in a kneader with a perforated-basket granulating device.

15. The method according to claim 7, wherein the polymeric salt is mixed in immediately before the deforming step, wherein the deforming step is carried out in an extrusion device.

16. The method according to claim 7, wherein 0.8 to 1.5% by weight of the salt is added.

17. The method according to claim 7, wherein the salt is added in the form of an aqueous preparation containing at least 40% by weight polymeric salt.

* * * * *